United States Patent [19]
Garrett et al.

[11] 3,899,945
[45] Aug. 19, 1975

[54] METHOD AND APPARATUS FOR ACCURATE DIE-CUTTING

[75] Inventors: Clyde Barner Garrett, Lanham; William Stansbury Thayer, Lutherville, both of Md.

[73] Assignee: Koppers Company, Inc., Pittsburgh, Pa.

[22] Filed: Nov. 1, 1973

[21] Appl. No.: 411,941

Related U.S. Application Data

[62] Division of Ser. No. 319,163, Dec. 29, 1972.

[52] U.S. Cl. .................... 83/38; 83/72; 83/299; 83/313; 83/346; 83/561
[51] Int. Cl.² ................ B23D 25/12; B26D 1/56
[58] Field of Search ......... 83/38, 72, 299, 312, 313, 83/311, 346, 347, 561; 241/63, 64

[56] References Cited
UNITED STATES PATENTS

| | | | |
|---|---|---|---|
| 2,706,944 | 4/1955 | Claff et al. | 83/312 |
| 3,276,306 | 10/1966 | Winkler et al. | 83/346 X |
| 3,347,119 | 10/1967 | Sarka | 83/38 |
| 3,448,646 | 6/1969 | Bishop | 83/38 X |

*Primary Examiner*—Donald R. Schran
*Attorney, Agent, or Firm*—Oscar B. Brumback; Boyce C. Dent

[57] ABSTRACT

Inaccurate cuts often occur in paperboard blanks passing between a pair of cooperating die and anvil cylinders because of anvil cylinder wear, irregular blank velocity, and other factors. Such inaccuracies are reduced by the method of driving the die cylinder at a preselected angular velocity and driving the anvil cylinder at an angular velocity proportional to the angular velocity of the die cylinder with the preselected proportion being maintained during changes in angular velocity of the die cylinder. The apparatus generally preferred for performing the method includes a mechanical variable speed transmission having an input driven by the die cylinder and an output for driving the anvil cylinder at an angular velocity corresponding to the angular velocity of the input and with the output velocity being selectively variable with respect to the input to provide an output velocity selectively proportional to the input velocity. However, the apparatus primarily preferred for performing the method includes a sensor means for sensing the velocity of the die cylinder, a variable speed motor means for driving the anvil cylinder, and a motor controller means responsive to the sensor means for controlling the output speed of the motor means to proportionally correspond to the velocity of the die cylinder, the controller means also including variable speed control means for changing the proportion of the anvil cylinder velocity to the die cylinder velocity for changing the output speed of the motor means. Another embodiment utilizes a mechanical variable speed transmission means in lieu of the motor means and a ratio control motor means responsive to the sensor through a similar motor controller means for varying the output of the transmission means to achieve a preselected proportion which is maintained during changes in velocity of the die cylinder.

16 Claims, 10 Drawing Figures

METHOD AND APPARATUS FOR ACCURATE DIE-CUTTING

This is a division of application Ser. No. 319,163, filed Dec. 29, 1972.

BACKGROUND OF THE INVENTION

1. Field of the Invention

This invention relates generally to cutting and more particularly to rotary tools with cooperating rotary resilient anvil back-up surfaces.

2. Description of the prior art

In the manufacture of solid fibre and corrugated paperboard cartons, it is usually necessary to form score lines and make cuts in the carton blanks to enable the blanks to be erected into finished cartons. It is now common practice to form the score lines, and particularly, to make the irregular cuts, in a machine referred to as a rotary die-cutter.

Rotary die-cutters may be of different types but one commonly used generally includes a pair of cooperating cylinders between which the blanks are passed. One of the cylinders (die cylinder) includes scoring rules and cutting blades mounted on a plywood die-backing and the other cylinder (anvil cylinder) is usually covered with a resilient covering such as polyurethane plastic. The arrangement is such that the cutting blades, which may have serrated cutting edges, penetrate through the carton blank and into the resilient covering. Reference to "cuts" hereinafter shall also include score lines where appropriate.

Since the cuts must usually be very accurate in length and positioned accurately in the blanks, it can be appreciated that the surface velocity of both the die and anvil cylinders should theoretically be the same as the lineal velocity of the blank passing between the cylinders. However, since the outer periphery of the cutting rules penetrate both the blank and resilient covering, it is obvious that the surface velocity of the tip of a rule entering a blank will be greater than the velocity of the effective radial midpoint of the rule, that is, the portion of the rule substantially in the center of the blank between its liners after penetration occurs. This factor affects the lineal velocity of the blank as it passes between the cylinders as does other factors such as blank thickness, height of cutting rules and stripping rubber, number and orientation of cutting rules, and the like.

It can also be appreciated that repeated penetration of the anvil covering by the cutting rules will eventually wear it out. However, wear of the covering has been reduced by axially oscillating the anvil cylinder very slowly so that the cutting rules do not penetrate in the same axial location on each revolution of the die and anvil cylinders. An example of this feature is shown in Ward U.S. Pat. No. 3,272,047. Alternatively, or in addition, the ratio of the nominal circumferences of the die and anvil cylinders may be other than 1:1 so that the cutting blades do not penetrate the anvil cover at the same location on each revolution of the cylinders.

In spite of these improvements, the anvil coverings continue to wear. The effect of this is that the surface velocity of the anvil cylinder gradually becomes less since the driving gears for the cooperating cylinders are in fixed proportion to provide substantially equal tangential velocities acting on the blank.

It has now been found that the difference in velocities caused by wear of the anvil cylinder covering substantially affects the length and location of cuts in the blanks and that by controlling the velocity of the blanks by controlling the velocity of the anvil cylindner, the accuracy of the length and location of the cuts can be substantially improved. For example, a difference between the angular velocity of the die cylinder and the angular velocity of the anvil cylinder of 1%, which may be caused by wear of the anvil covering, may result in an error of 0.375 of an inch in cut length in a blank about 38 inches long measured in the direction of travel of the blank (hereinafter called "vertical" cut) or a similar mislocation of tranverse cuts across the blank (hereinafter called "horizontal" cut). Accordingly, by controlling the tangential or surface velocity of the anvil cylinder to within about 0.1% of the velocity of the die cylinder, the error can be reduced to about 0.038 of an inch for a blank about 38 inches long which is quite acceptable.

It was previously believed that by constructing the anvil covering so that it would slip with respect to the uniformly rotating anvil cylinder upon which it is mounted, the penetration of the cutting rules in the covering would cause the covering to substantially follow the velocity of the cutting rules and thereby result in accurate cuts. An example of this construction may be found by reference to Sauer U.S. Pat. No. 3,274,873. However, this construction has not been entirely successful because, apparently, the necessarily different velocities of different radial portions of the cutting rules is at least partially transferred to the blanks because of their penetration in the blanks causing irregular velocity of the blanks which is then transferred to the anvil covering. Besides cutting rule penetration in the cover, stripping rubber attached to the cutting die alongside and between the rules presses the blanks against the anvil cover so that the blanks tend to advance at the velocity of the cover. Thus, the blanks tend to control the velocity at which the anvil covering slips which does little to control the velocity of the blanks; therefore, accurate rotary die-cutting remains a problem.

SUMMARY OF THE INVENTION

Accordingly, an object of the present invention is to provide a method and apparatus for controlling the accuracy of cuts made in paperboard blanks both as to their length and to their location in the blank. Improved accuracy results in considerable savings realized from the reduction of scrapped blanks and reduces problems associated with the erection of the blanks into cartons caused by inaccurate cut sizes and location.

These and other objects are generally achieved by the method of driving the die cylinder at a selected angular or tangential velocity and driving the cooperating anvil cylinder at a tangential velocity that is selectively proportional to the velocity of the die cylinder to control the velocity of the blank passing between the cylinders thereby compensating for irregular velocities imposed on the blank from the characteristics of the cutting rules and other factors and to control the velocity of the anvil cylinder to be nearly identical to the velocity of the die cylinder even though the anvil cylinder circumference may be less than nominal with respect to the effective diameter of the cutting rules. Preferably, the selected proportional velocity of the anvil cylinder is maintained during speed changes of the entire machine.

In conventional rotary die-cutters, the die and anvil cylinders are merely geared together for driving rotation. This connection causes the anvil cylinder to follow or track the velocity of the die cylinder exactly and the proportional velocity of the anvil cylinder with respect to the die cylinder to remain fixed.

To cause the anvil cylinder to follow the velocity of the die cylinder and, at the same time, provide a means for varying the proportional velocity of the anvil cylinder with respect to the die cylinder, the cylinders may be connected through a variable speed transmission, either mechanical, electrical, hydraulic, or combinations of such devices. The anvil cylinder velocity will thereby track the velocity of the die cylinder throughout the speed range of the rotary die-cutter and the velocity of the anvil cylinder can also be selected in proportion to the velocity of the die cylinder by changing the output speed of the transmission with respect to its input.

Thus, the objects of this invention can be achieved generally by driving the die cylinder at a first angular or tangential velocity and driving the anvil cylinder at a second angular or tangential velocity selectively proportional to the first velocity. Apparatus suitable for performing this method comprises a transmission means with an input connected to the die cylinder and a selectively controlled output connected to the anvil cylinder for imparting a selectively proportional velocity thereto; the foregoing method and apparatus being generally the preferred embodiment of this invention.

However, a fine degree of accuracy is desired. This means that the proportional velocity of the anvil cylinder must be closely controlled. Unfortunately, presently available variable speed transmission devices capable of transmitting the required horsepower, for example about 5 horsepower, and suitable for the present environment are seldom as accurate as desired, providing only a coarsely controllable output. To overcome this shortcoming, this invention also contemplates the use of a variable speed drive means including an input responsive to the velocity of the die cylinder to provide tracking control, an output connected to the anvil cylinder that is responsive to the drive means input, and drive control means automatically responsive to both the velocity of the die cylinder and to selectively operable velocity proportioning means. The drive control means is arranged to provide a fine resolution and selectively operable proportional velocity control.

Accordingly, a more practical and the primarily preferred method of achieving the objects of this invention comprises driving the die cylinder at a first angular velocity, driving the anvil cylinder at a second angular velocity selectively proportional to the first velocity, sensing the velocity of the cylinder, and controlling the velocity of the anvil cylinder in response both to the sensed velocity and to selectively operable proportioning means.

Apparatus suitable for preforming the foregoing method preferably comprises a drive means for driving the die cylinder, which is conveniently the drive means for the entire rotary die-cutter; a drive means for the anvil cylinder which preferably utilizes a variable speed drive motor means with an output connected to the anvil cylinder, such output being responsive to the velocity of the die cylinder so that its output follows or tracks the velocity of the die cylinder; and a drive motor control means for selectively varying the drive motor output speed with respect to its tracking velocity to provide an output that drives the anvil cylinder at a selected velocity proportional to the velocity of the die cylinder.

It should be understood that the velocity of the die cylinder, used as a reference for coarsely controlling the output of the drive motor means, only approximates the velocity of the blank itself, the blank velocity perhaps being irregular as previously stated; thus, final selection of the proportional velocity needed can best be determined by visual inspection of or measuring the length and location of cuts made in blanks passing between the cylinders and selecting the proportional velocity accordingly. The proportional control can be fine-tuned in this manner.

A second embodiment utilizes a mechanical type variable speed transmission means, rather than a variable speed motor, with a primary input connected to the die cylinder thereby tracking the velocity of the die cylinder and an output connected to the anvil cylinder that is responsive to the primary transmission input for rotating the anvil cylinder at a velocity generally corresponding to the velocity of the die cylinder. This arrangement also includes a control motor means responsive to the velocity of the die cylinder for supplying an auxiliary input to the transmission to provide a fine resolution and selectively variable output with respect to the primary input for selectively controlling the proportional velocity of the anvil cylinder with respect to the die cylinder.

Several types of mechanical transmissions may be used, their common characteristics being that their outputs are responsive to both a primary input and an auxiliary input to achieve fine resolution and selectively variable control of the output.

The foregoing methods and apparatus provide a means for controlling the accuracy of cut sizes and locations in the blank preferably to an accuracy of at least plus or minus 0.1% which amounts to an accuracy of about 0.038 inches in a blank 38 inches long which accuracy is not consistently attainable with known rotary die-cutters.

The above and further objects and novel features of the invention will appear more fully from the following detailed description when the same is read in connection with the accompanying drawings. It is to be expressly understood however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

The present invention is concerned with controlling the accuracy of cuts made in a paperboard blank passing between a pair of cooperating die and anvil cylinders. It has been discovered that the porportion of the velocity of the anvil cylinder with respect to the velocity of the die cylinder greatly affects the accuracy of such cuts. Apparently, the nature of the cutting action by the dies tend to impart an irregular velocity to the blank as it passes between the cylinders but the amount of such irregularity may be greatly reduced by controlling the velocity of the anvil cylinder.

In addition, it has been discovered that decreased tangential velocity of the anvil covering caused by wear of the covering affects the accuracy of cuts made in the blanks and that such condition can be compensated for by controlling the tangential velocity of the anvil cylinder and its covering relative to the velocity of the die cylinder, the latter representing the production speed of the entire machine.

The accuracy of cuts may be controlled generally by the method of driving the die cylinder at a selectively substantially constant velocity and driving the anvil cylinder at a velocity selectively proportional to the die cylinder velocity. More specifically, more accurate control is achieved by maintaining the proportional velocity of the anvil cylinder during any changes in velocity of the die cylinder, for example, when the die-cutter base speed is increased or decreased. Accurate control is further enhanced by selecting a proportional velocity of the anvil cylinder to meet operating conditions which may change because of the type and size of blank being cut, the number, size, and configuration of cuts in the blank, the base die-cutter speed, and so on.

Figures 2, 3:
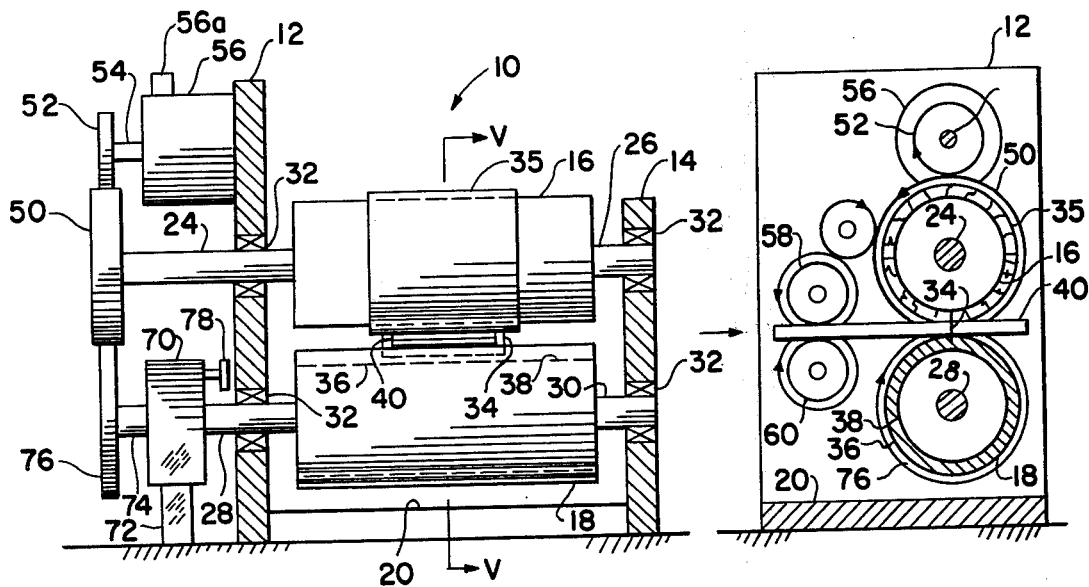
FIG. 2 is a schematic illustration in front elevation of a rotary die-cutter including a pair of cooperating die and anvil cylinders and the generally preferred arrangement for driving the anvil cylinder at a velocity corresponding to the velocity of the die cylinder and at a selectable proportion thereto.
FIG. 3 is a schematic illustration in side elevation of the arrangement of FIG. 2.

The foregoing methods may be performed by several types of apparatus. For example, FIG. 2 illustrates the use of a mechanical variable-ratio transmission placed between the input drive and the anvil cylinder. The ratio of the output of the transmission with respect to its input can be manually selected to rotate the anvil cylinder at a velocity selectively proportional to the velocity of the die cylinder. Commercially available and well-known P.I.V. drives are suitable for this arrangement.

Although this arrangement is generally preferred, its usefulness is limited to the accuracy of the transmission ratio as previously mentioned.

Figure 6:
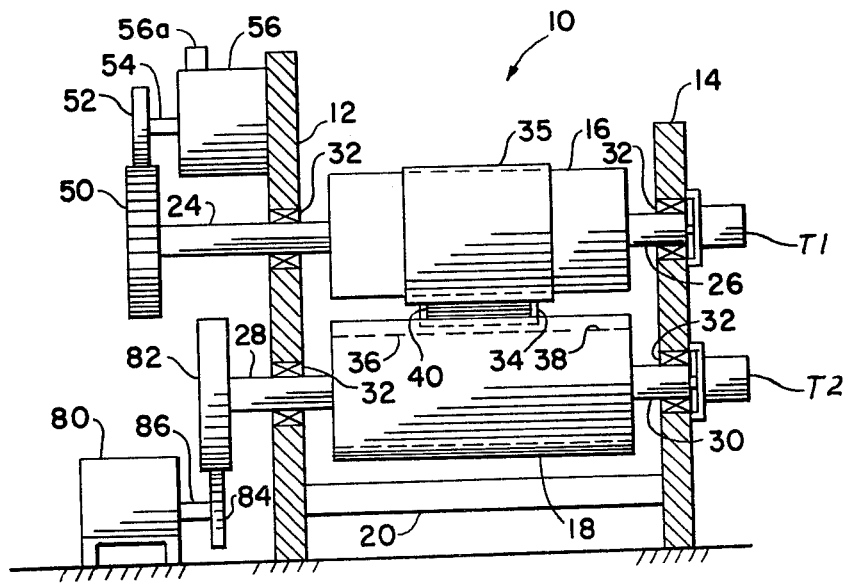
FIG. 6 is a schematic illustration in front elevation similar to FIG. 2 showing the primarily preferred arrangement comprising a drive motor transmission and proportional control system.

A similar arrangement is shown in FIG. 6 except that a variable-speed electric motor is used in place of the mechanical transmission. By rheostat or similar control, the output speed of the motor may be selected in proportion to the speed of the die cylinder. This arrangement provides only a relatively coarse control since the motor, as well as the previously mentioned transmission, basically receive only one input and have only one output.

To achieve the fine degree of control desired, the primarily preferred arrangement utilizes a transmission having two inputs and one output. It can be said that one input provides a relatively coarse control which is modified by the second input to provide a fine resolution control of the transmission output.

Figure 7:
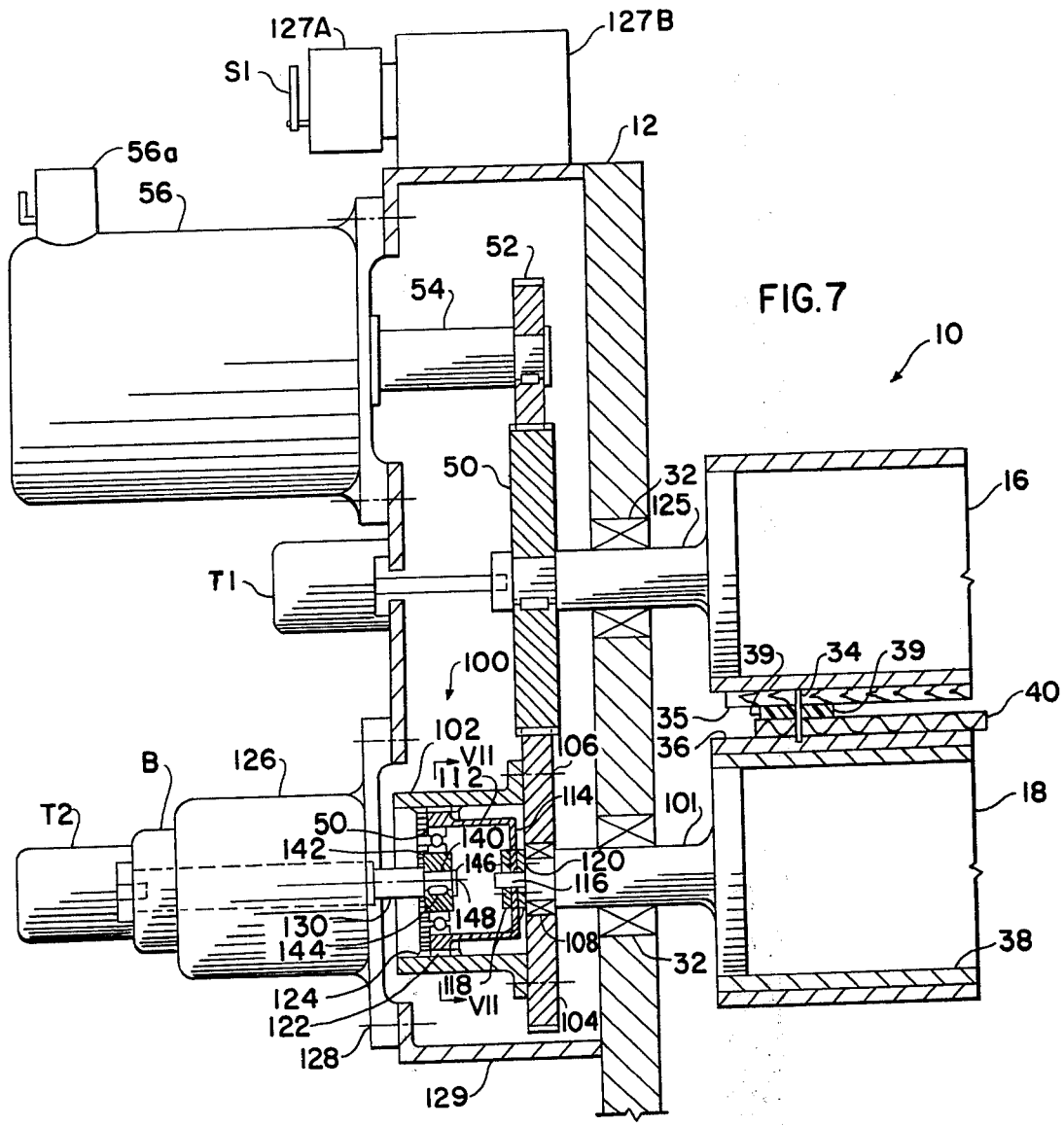
FIG. 7 is a schematic illustration in front elevation showing a harmonic type transmission and proportional control substituted for the transmission arrangement of FIG. 6.

Examples of this arrangement are shown in FIGS. 6 and 7. The arrangement of FIG. 7 uses a transmission having one mechanical input and one electrical input with its output connected to the anvil cylinder. For example, a harmonic drive of the general construction illustrated in Musser U.S. Pat. No. 2,906,143 may be used as the transmission. One input to the harmonic drive is provided by the main drive train of the die cylinder to cause the output of the drive to track the speed of the die cylinder. The other input is provided by a small electrical control motor whose speed can be manually selected to provide the desired proportional speed; the motor is used to control the output speed of the harmonic drive to within a small range. A signal from a tachometer on the die cylinder causes the control motor to also track the speed of the die cylinder to maintain the selected proportional speed as the base speed of the die cylinder is changed.

Figure 1:
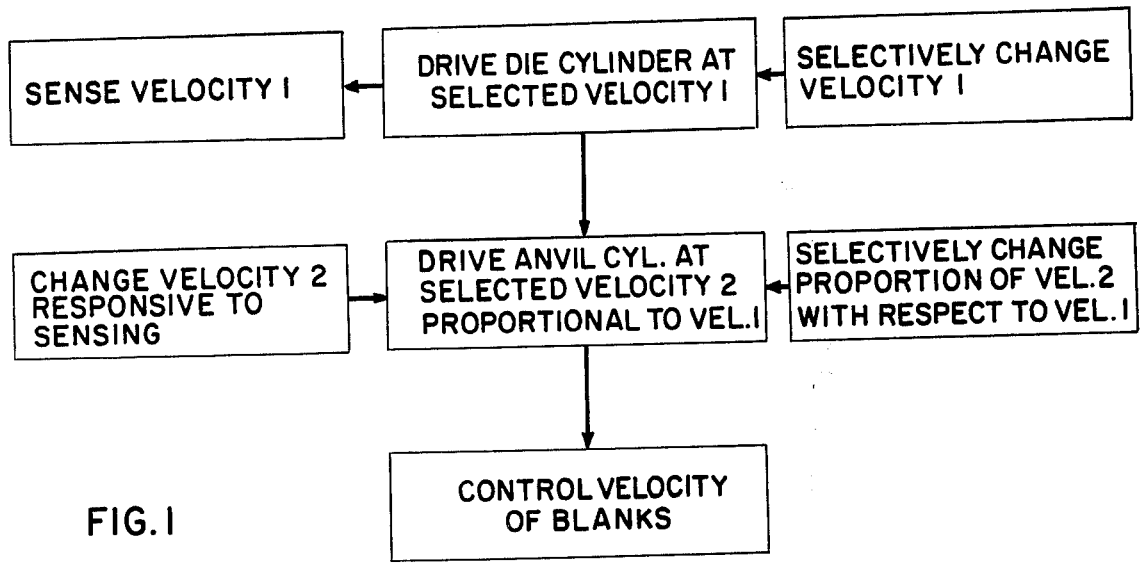
FIG. 1 is a block diagram illustrating the general and preferred method of controlling the accuracy of cuts made in die-cut blanks.

More specifically, FIG. 1 represents both the generally and primarily preferred methods of the present invention. The basic method is shown in the three vertical blocks in the center of the diagram. That is, the basic objective is accomplished by driving the die cylinder at a first selected velocity and driving the anvil cylinder at a second selected velocity proportional to the first velocity to control the velocity of the blanks. This leads to improve accuracy of cuts in the blanks as previously explained. However, it is often desirable to change the base speed of the machine; that is, change the velocity of the die cylinder because of the size of blanks processed, etc. This step is illustrated at the upper right of the diagram. Of course, it is also desirable to maintain the selected proportion of the second or anvil cylinder velocity to the first velocity during and after the base speed has changed. This step is illustrated to the lower right of the diagram.

But, the primary objective is to provide a fine degree of control of the second velocity. This is accomplished by sensing the actual velocity of the die cylinder and then changing the velocity of the anvil cylinder to correspond to the first velocity of the die cylinder. These steps are illustrated to the left of the diagram. It can easily be seen that the selected proportion of the second velocity is maintained even though the second velocityh changes in response to fluctuation or deliberate change of the first velocity.

FIG. 2 schematically illustrates a conventional rotary die-cutter adapted for operation in accordance with the generally preferred method and apparatus of the present invention. The die-cutter generally denoted by numeral 10 includes a pair of spaced side frames 12 and 14 between which are mounted a pair of cooperating cylinders, the upper of which is the die cylinder 16 and the lower of which is the anvil cylinder 18. A cross-tie 20 rigidly connects the frames 12 and 14. The cylinders 16 and 18 include individual journals 24, 26, and 30 extending through conventional bearings 32 in frames 12 and 14 which permit the cylinders to freely rotate about their axes.

The die cylinder 16 is constructed to carry conventional cutting and scoring rules 34 mounted on the arcuate plywood backing or die blanket 35 secured to the cylinder; the anvil cylinder is usually completely covered by a relatively thin resilient cover 36 such as polyurethane plastic. This cover may be bonded to a metal drum portion 38 of cylinder 18 but is preferably mechanically fastened thereto to permit replacement of extremely worn covers. An arrangement of the nature is shown and described in sauer U.S. Pat. No. 3,577,822 although other similar constructions will work equally well with the present invention.

Figure 4:
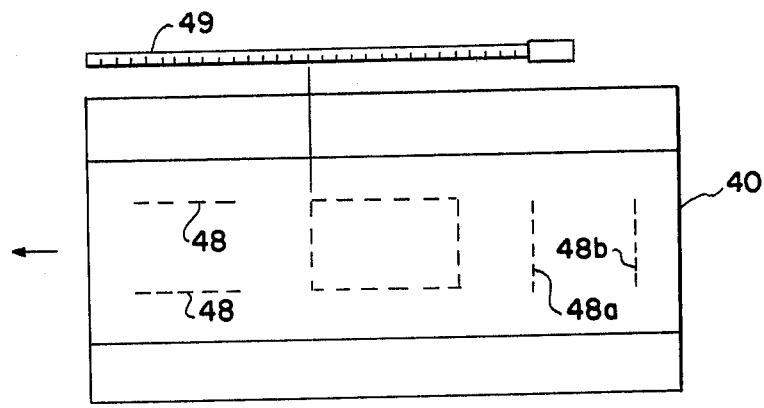
FIG. 4 is a plan view of a typical blank showing both vertical and horizontal cuts therein.

As the cylinders 16 and 18 rotate, paperboard blanks 40 (FIG. 3) similar to the blank shown in FIG. 4 are successively advanced between them in lineal register with the rotating rules 34 which cut and score the blanks. The radial height of the scoring rules (well-known and not specifically shown) is such that their rounded outer edges make depressions in the blanks which permit the finished blanks to be folded along the score lines. The cutting rules 34 (see FIG. 5) usually have serrated edges 37; their radial height (from the surface of the die cylinder 16) is such that their outer serrated edges penetrate through the blank 40 and slightly into the cover 36 as they pass through radial alignment with the axis of the anvil cylinder.

Figure 5:
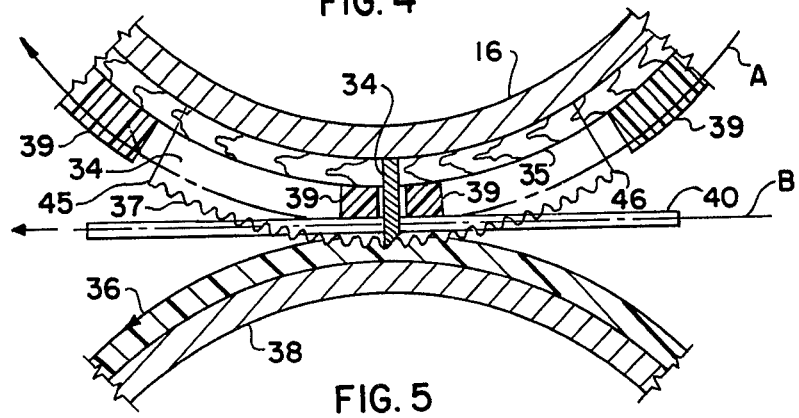
FIG. 5 is an enlarged view in cross-section of a portion of the cylinders of FIG. 2 taken along line V—V and showing the penetration of the cutting rules in a blank.

The length of the vertical cuts 48 made in blanks 40 (see FIG. 4) is first determined by the arcuate length of the cutting rules similar to rule 34 in FIG. 5. However, the actual length that is cut may be longer or shorter than the desired length if the blank is accelerated or decelerated as it passes between the cylinders 16 and 18. For example, if die cylinder 16 is driven at a constant selected velocity by drive motor 56 (to be subsequently explained), then cutting rules 34 will rotate at a constant velocity. Should the blank 40 be accelerated following the penetration of the tip 45 of rule 34 in blank 40, then a length of paperboard greater than the length of rule 34 will pass between the cylinders before the penetration of trailing tip 46 in blank 40 occurs. This results in a cut longer than the length of rule 34. Conversely, should blank 40 be decelerated, then a cut shorter than the length of rule 34 will be made.

It can also be seen that acceleration or deceleration of blank 40 will similarly result in the spacing, in the direction of blank travel, between horizontal cuts 48a and 48b being too long (if acceleration occurs) or too short (if deceleration occurs).

Several factors are believed to influence the velocity of the blanks 40 as they pass between cylinders 16 and 18. For example, the pull rolls 58 and 60 illustrated in FIG. 3 advance the blanks 40 between the die and anvil cylinders 16 and 18 at the selected nominal speed of the cylinders. But, since the trailing edge of blank 40 passes from between the pull rolls while the blank is engaged by the cylinders, whatever control is exerted on the velocity of the blank by the pull rolls is lost. Furthermore, the pull rolls are not totally effective in overcoming other factors influencing the velocity of the blank even during their engagement with the blank.

It can be readily seen by referring to FIG. 5 that the height of the rule 34 from the die cylinder 18 along an imaginary arcuate line denoted A is tangential to line B which is the center of the thickness of the blank 40. Line A (hereinafter referred to as the "nominal" height) should theoretically have a tangential velocity equal to the lineal velocity of line B. However, the full height of rule 34 is greater than its nominal height which means that its outer circumferential or tangential velocity is greater than the nominal velocity. Thus, it can be seen that as the leading edge or tip 45 of rule 34 enters blank 40, it will tend to accelerate the blank until the rule reaches full penetration of cover 36 at which time the rule and blank will tend to be at the same velocity. As the rule 34 leaves the blank 40, its trailing edge or tip 46 again tends to accelerate the blank. It appears that such penetration tends to impart an irregular velocity to blank 40.

The most important factor influencing blank velocity is that the cutting and scoring rules and the stripping rubber 39 (see FIG. 5) urge the blank into frictional engagement with anvil cover 36 so that the blank tends to advance at the velocity of the anvil cylinder. Stripping rubber 39 conventionally comprises strips of compressible foam rubber secured to die blanket 35 along side of cutting rules 34 and is often secured circumferentially around the blanket between the cutting rules to serve as pull bands for advancing the blanks between the cylinders. Although such frictional engagement may not be sufficient to completely overcome the factors tending to impart irregular velocity to the blank, it is sufficient to permit control of blank velocity by controlling the velocity of the anvil cylinder 18 and thus the surface or tangential velocity of anvil cover 36. And, it can be seen that the surface velocity of anvil cylinder cover 36 is dependent on the angular velocity of cylinder 18 and the circumference of cover 36. Thus, as the anvil cover 36 wears, its circumference is reduced thereby reducing its surface velocity; when the surface velocity is reduced, blank velocity is also reduced by virtue of the cover's influence on the blank and consequently, the length of the vertical cuts 48 becomes shorter.

In accordance with this invention, the surface velocity of the anvil cylinder cover is controlled by driving the anvil cylinder 18 at an angular velocity selected to cause the cover 36 to exert sufficient influence on blank velocity to overcome any inaccuracies of cut length and location in the blanks. This may be accomplished in accordance with the following description.

Referring back to FIG. 2, journal 24 of die cylinder 16 includes a conventional spur tooth gear 50 secured for driving rotation therewith; gear 50 is driven by another gear 52 secured to the output shaft 54 of a main drive motor 56 for the die-cutter 10. Thus, energization of motor 56 will rotate die cylinder 16 at the desired speed.

It should be understood that the die cylinder 16 is usually driven by gearing connected to a conventional feeder (not shown) that feeds blanks 40 in sequence between cylinders 16 and 18. For example, in FIG. 3, a pair of pull rolls 58 and 60 convention lly grip the blanks 40 as they are fed therebetween and feed them between cylinders 16 and 18. These pull rolls may be driven from adjacent gearing on the blank feeder and in turn drive the die cylinder by similar conventional gearing. This gearing has been omitted for clarity and the cylinder 16 is shown as being driven by motor 56 for simplicity since it is immaterial to the present invention whether the cylinder 16 is synchronously driven by the motor or by adjacent machinery. Likewise, the normal gear guards, lubrication system, and the like have been omitted since they form no part of the invention and are well known by those skilled in the art.

The journal 28 of anvil cylinder 18 extends into or is otherwise coupled to a mechanical transmission 70, which may be supported by a base 72, in alignment with journal 28. Transmission 70 also includes an input shaft 74 upon which is secured a spur gear 76 which is itself in mesh with gear 50. Thus, motor 56 rotates cylinder 16 and cylinder 18 through transmission 70. Thus, as the motor 56 is accelerated or decelerated, the velocity of cylinder 18 will follow or track the velocity of cylinder 16.

However, the input to output ratio of transmission 70 is manually selectively variable; that is, the transmission output journal 28, which is the input to anvil cylinder 18, can be made to run faster or slower than input shaft 74 within the design range of the transmission. This may be accomplished by turning a control crank 78 on the housing of the transmission. An example of a suitable transmission is one made by FMC Corporation, Link-Belt Division, Philadelphia, Penn., Type HGDD size 3 narrow speed range output differential which can be selectively adjusted to provide an output speed range 2% above and 2% below the nominal output speed. Because of the characteristics of this differential, it may be necessary to approximately double its input to output speed to obtain an output speed that is equal to the speed of the die cylinder when the ratio control crank 78 is at its mid-position. This may easily be done by changing the ratio of gears 50 and 76 to make gear 76 turn about twice as fast as gear 50. Whatever ratio is selected will be maintained during any speed changes of the input. Thus, as the velocity of the die cylinder is increased or decreased, the velocity of the anvil cylinder will likewise increase and decrease but at the selected proportional speed.

If preferred, the foregoing arrangement can be achieved electrically. FIG. 6 schematically illustrates such an arrangement. The construction of the die-cutter 10 remains essentially the same as that shown in FIG. 2 with respect to the side frames, cylinders and the like as indicated by the corresponding part numbers. However, in this construction, the cylinders 16 and 18 are not geared together as before. Instead, main drive motor 56 drives only cylinder 16; another drive motor 80 drives the anvil cylinder 18. Motor 18 may be supported at any convenient place, as on the floor, adjacent journal 28. A spur toothed gear 82 is secured for driving rotation with journal 28; a similar gear 84 is secured for driving rotation on the output shaft 86 of motor 80 in mesh with gear 82. Thus, as motor 80 rotates, it drives cylinder 18 through gears 84 and 82.

Motor 80 is preferably a variable speed D.C. motor whose output speed can be controlled such as by a conventional rheostat (not shown). Thus, if main drive motor 56 is driving the die cylinder at one selected angular velocity, the speed of motor 80 can be controlled to run at a speed equal to, faster, or slower than the main drive motor to provide the desired proportional speed between the two cylinders 16 and 18.

However, the speed of die cylinder 16 may be increased or decreased throughout a run of blanks through the die-cutter 10 such as by a conventional rheostat speed selector control 56a; therefore, it is desirable to cause motor 80 to follow or track the main drive motor. This may be accomplished by mounting a conventional analog or digital tachometer T1 for rotation by die cylinder 16 as shown in FIG. 6. The signal produced by the tachometer will be proportional to the speed of the cylinder 16 and a motor controller (see FIG. 8) to cause the speed of the motor 80 to track the speed of the main drive motor 56. In this manner, both tracking and selectively proportional speed control is provided.

However, for more accurate control, a better system also utilize a second tachometer T2 connected for rotation by journal 30 of anvil cylinder 18 as shown in FIG. 6. The signals produced by both tachometers T1 and T2 are directed to a speed selector and motor controller (to be later described) which basically compares the signals and then supplies the proper voltage to motor 80 for controlling its output speed both as to tracking and selectively proportional control.

Both of the foregoing arrangement illustrated in FIGS. 2 and 6 provide a relatively coarse control because of the inherent characteristics of the transmission 70 and motor 80, the transmission 70 having a single mechanical input and providing a selectively proportional output, the motor 80 having a single electrical input and providing a selectively proportional output when the above mentioned tachometers, speed selector, and motor controller are not used.

As previously mentioned, it is desirable to provide a fine degree of control of the velocity of the anvil cylinder 18. The next arrangement to be described includes two inputs to the transmission and one output; the function of the second input being to refine the operation of the first input to provide a closely controllable proportional output. The arrangement of FIG. 7 illustrates a mechanical transmission with one mechanical input and one electrical input. The electrical input is selectively adjustable to provide the desired selectively proportional output that automatically tracks the speed of the die cylinder.

Referring now to FIG. 7, the mounting cylinders 16 and 18 in frames 12 and 14 remains the same as shown in FIG. 2. Similarly, drive motor 56 rotates die cylinder 16 by means of gears 52 and 50 at the velocity selected by speed control 56a for cutting the blanks 40 passing between the cylinders. However, a harmonic type transmission 10 is mounted on journal 101 of anvil cylinder 18 as best shown in FIG. 7. The principle of this transmission is fundamentally as shown and illustrated in Musser U.S. Pat. No. 2,906,143.

The harmonic drive 100 includes a flanged rigid circular spline 102 mounted to the side of a driving gear 104 by screws 106 in the ordinary manner. Driving gear 104 is mounted on a roller bearing 108 secured to the end of journal 101 so as to be freely rotatable thereabout and is in mesh with gear 50 so as to be driven thereby; this comprises the primary input of harmonic drive 100.

A flexible circular spline 112 is nested within rigid spline 102. One end of flexible spline 112 is closed by a radially-extending end portion 114 having a central opening surrounding a reduced shoulder portion 116 of journal 101. End portion 114 is secured for rotation with journal 101 by washers 118 disposed on both sides of the end portion with screws 120 passing through both washers 118 and end portion 114 and into journal 101 in the ordinary manner. This construction also axially secures bearing 108 on reduced shoulder portion 116 of journal 101.

The open end of flexible spline 112 includes external spline teeth 122 around its outer periphery. These teeth are adapted to mesh with corresponding internal spline teeth 124 formed around the inner periphery of rigid spline 102.

A control motor 126 is mounted by screws 128 to a support 129 secured to and spaced from the side frame 12; motor 126 includes an output shaft 130 extending in coaxial alignment with the central axis of flexible spline 112.

Shaft 130 includes a reduced shoulder portion 140 upon which a wave-generator cam 142 is secured for rotation therewith by a conventional shaft key 144, washer 146, and screw 148 in the ordinary manner.

Figure 7A:
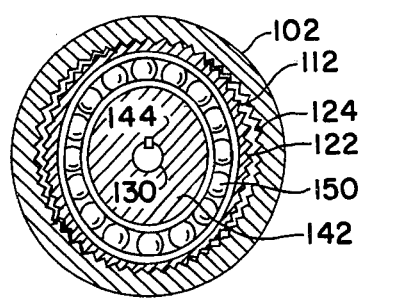
FIG. 7a is a sectional view of a portion of the harmonic transmission of FIG. 7 taken along line VII—VII.

An elliptical roller bearing 150 is secured, as for example by a press fit, around the periphery of cam 142 which is also elliptical as illustrated in FIG. 7a. The major diameter of the bearing 150, that is, the portion opposite the lobes of cam 142, urges the external spline teeth 122 into meshing engagement with the internal spline teeth 124.

Operation of the harmonic transmission 100 is, briefly, as follows. Driving gear 104 is secured to the rigid spline 102, as previously described, and is adapted for rotation around journal 101 by means of bearing 108. Journal 101 is secured for rotation with flexible spline 112. The wave-generator, comprising cam 142 and bearing 150, is rotated by the motor output shaft 130 extending from control motor 126; the motor 126 continuously rotates the wave-generator to change the angular velocity between gear 104 and anvil cylinder 18 when cylinder 18 is to be rotated faster or slower than die cylinder 16.

It should be understood that the flexible spline 112 is made of thin flexible metal (although plastic materials can be used where the torque to be transmitted is small) so that the wave-generator can deflect the external teeth 122 into engagement with internal teeth 124 of rigid spline 102 at the two points opposite the lobes of cam 142. Thus, rotation of the wave-generator will result in a continuously moving waveform transferred to flexible spline 112. This causes the flexible spline 112 to rotate with a greately reduced tangential motion. A full rotation of the wave-generator by output shaft 130 will produce a rotation of flexible spline 112 through a distance equal to the difference between the circumference of the rigid spline 102 and the circumference of flexible spline 112. Consequently, the actual reduction ratio can be obtained by dividing the difference between the two circumferences into the circumference of the flexible spline 112. Since the spline teeth on both the flexible spline 112 and rigid spline 102 have the same circular pitch, the actual number of teeth on each can be used as the circumferential measurement; the reduction ratio of any unit can be computed by dividing the difference between the number of teeth on the two splines into the number of teeth on the output member (flexible spline 112). For example, if the rigid spline 102 has 202 teeth and the flexible spline 112 has 200 teeth, the ratio would be 200/202−200 =200/2 =100:1. Thus, when the harmonic drive is used in the ordinary manner with the rigid spline 102 fixed and the input going into wave-generator 142, the output of flexible spline 112 would be one revolution for each hundred revolutions of the input shaft 130 by motor 126.

However, as used in the present invention, the wave-generator 142 is rotated continuously by motor 126 and rigid spline 102 is rotated continuously by gear 104; thus, the rigid spline 102 constitutes a primary input which rotates at machine speed, that is, the same speed as the die cylinder 16, and cam or wave-generator 142 constitutes a secondary input which rotates at the speed of motor 126; flexible spline 112 constitutes the output with its rotation transferred to die cylinder 16 through journal as previously described. Thus, the output of flexible spline 112 is at the ratio of 202:200 (or 101:100), that is, 101 revolutions for each 100 revolutions of input by rigid spline 102.

Since the cylinders 14 and 16 theoretically rotate at the same circumferential velocity as the lineal velocity of the blank being printed, it is necessary to establish the foregoing ratio in reverse between the cylinder driving gears 50 and 104. For example, if gear 50 on die cylinder 14 has 100 teeth, then gear 104 on anvil cylinder 18 will have 101 teeth to reduce its velocity by the same amount that the velocity of flexible spline 112 is increased by rigid spline 102. In this manner, the circumferential velocity of the cylinders 16 and 18 is made equal to the lineal velocity of the blank 40 being cut when the wave-generator 142 is held stationary. Thus it can now be seen that motor 126 rotates continuously only when the velocity of anvil cylinder 18 is selected to be above or below the velocity of die cylinder 16.

In the present invention, the accuracy of the cuts being made in blanks 40 is controlled by rotating the anvil cylinder 18 in most instances either faster or slower than the die cylinder 16. This is achieved by running control motor 126 in a forward or reverse direction to add to or subtract from the angular velocity or speed of the flexible spline 112 thereby increasing or decreasing the speed of the anvil cylinder 18 in direct proportion to the speed of the die cylinder 16. As previously mentioned, the frictional engagement between the resilient covering 36 of cylinder 18 and blanks 40 tends to smooth out irregular velocities tending to be imparted to the blanks by the cutting rules 34 on the die cylinder.

The amount of overspeed or underspeed can be selected by increasing or decreasing the speed of control motor 126. Thus, motor 126 is preferably a reversible D.C. motor whose speed can be controlled such as by a motor controller to be subsequently described. Basic tracking is achieved by rotation of the primary input gear 104 by die cylinder gear 50. However, it can be readily understood that if the speed gear 104 is increased, such as by an increase in base machine speed, and motor 126 is permitted to rotate at a constant preselected speed, then the resultant output through flexible spline 112 would change the desired proportional speed. Accordingly, a tachometer T1 is connected for rotation by the die cylinder journal, for example, by journal 125; a signal corresponding to die cylinder speed is produced by the tachometer and directed to the motor controller for motor 126. This causes motor 126 to also track changes in the speed of die cylinder 16 thereby maintaining the output speed of the harmonic transmission 100 in the selected proportion to the speed of the die cylinder 16. Preferably, another tachometer T2 is connected for rotation by the motor shaft 130 (see FIG. 7 and FIG. 8) to supply a feedback signal to the motor controller which then supplies a corrected voltage to motor 126 to maintain the exact proportional speed desired.

A harmonic drive with a 100:1 ratio provides a high-resolution phase adjustment. For example, one revolution of the wave-generator 142 produces an angular phase shift of 3.6° of spline 112 with respect to spline 102. If the cylinder 18 is 50 inches in circumference, one revolution of wave-generator 142 by motor 126 produces a circumferential shift of 0.5 inches of the cylinder 18 relative to the nominal circumference of cylinder 16. The wave-generator 142 may be easily rotated a fraction of a revolution per one revolution of gear 104 to thereby produce a phase shift of a few thousandths of an inch so that very accurate control of the angular velocity of cylinder 18 can be obtained. If desired, motor 126 may be a gear motor with shaft 130 extending from a reduction gear box portiton of the motor to obtain even similar phase shifts.

Figure 8:
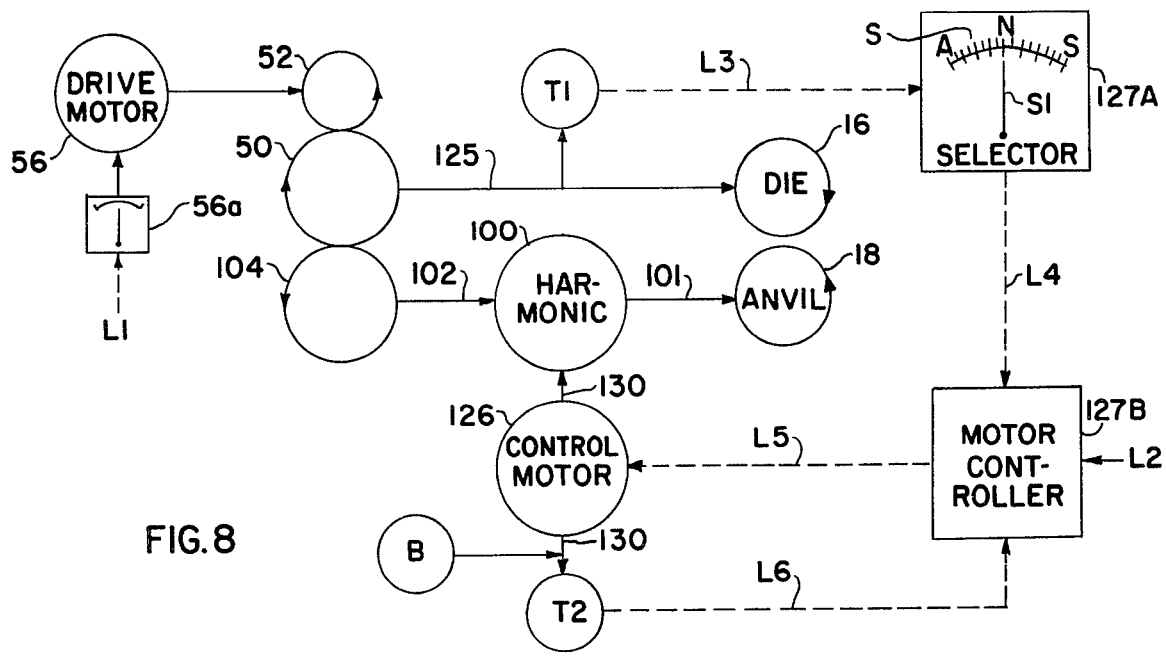
FIG. 8 is a schematic diagram illustrating the electromechanical arrangement for controlling the speed of the anvil cylinder relative to the die cylinder.

FIG. 8 is a schematic illustration of the electromechanical arrangement for controlling the speed of anvil cylinder 18 with respect to the speed of die cylinder 16 utilizing the drive arrangement of FIG. 7. Main drive motor 56 is a D.C. motor whose input speed can be controlled by varying the supply voltage in lead L1, such as by rheostat control 56a, which may be at 220/440 volts. Motor 56 is directly connected to die cylinder 16 by its output shaft 54, gears 52 and 50 and journal 125. Thus, die cylinder 16 will rotate at a speed corresponding to the speed selected for drive motor 56.

Anvil cylinder 18 is driven indirectly by drive motor 56 through gears 52, 50, 104, and harmonic drive 100 through journal 101.

The harmonic drive 100 includes a primary input 102 driven by gear 104 so that the harmonic drive tracks the speed of the main drive motor 56; its output is through shaft 101 to anvil cylinder 18; thus, cylinder 18 basically tracks the speed of the main drive motor 56.

The harmonic drive 100 includes a secondary or auxiliary input 142 from control motor 126 via the motor shaft 130 and functions to add to or subtract from the input speed of the harmonic drive to thereby vary the output speed in a selected proportion to the basic input speed from main drive motor 56.

Control motor 126 is a bidirectional D.C. motor whose output can be varied with respect to both direction and speed by controlling the polarity and magnitude of the supply voltage to its armature. Output shaft 130 provides the secondary input to the harmonic drive 100 which adds to or subtracts from the speed of the harmonic drive output to anvil cylinder 18 as previously explained. Control motor 126 may also include an integrally mounted brake B to hold the output shaft 130 when the motor is not turning as will be subsequently explained.

A selector 127A and motor controller 127B are used to control the direction and speed of control motor 126. Selector 127A includes a selector lever S1 movable from a "neutral" or null position to an "add" or "subtract" position in incremental steps from the neutral position. The selector 127A comprises a conventional divider network whose supply voltage comes along lead L3 from a tachometer T1 driven by journal 125 (see FIG. 7). The selector S1 selects the total output of tachometer T1 when positioned at the full add or subtract positions or selects fractions thereof at incremental positions between neutral and the full positions. At the neutral position, it selects no voltage.

When selector lever S1 is moved toward the add position, it closes a relay (not shown) within the motor controller 127B to supply, for example, "positive" polarity voltage along lead L5 to control motor 126. When the selector lever S1 is moved toward the subtract position, it closes another similar relay (not shown) within the motor controller to supply a "negative" polarity voltage along lead L5 to motor 126. When the neutral position is selected, both relays are open.

Motor controller 127B may be, for example, a conventional silicon controlled rectifier network such as Model 8503 SCR Motor Speed Control sold by Seco Electronics Corp., Hopkins, Mich. The controller functions to rectify a supply voltage, for example, at 110/120 volts, from lead L2 to the armature of control motor 126 along lead L5. The level of voltage supplied along L5 is controlled by the level of the control voltage in lead L4 from the selector 127A. The circuit is arranged in the conventional manner so that the selector lever S1 is at neutral, there is no voltage in leads L4 or L5 and the control motor 126 remains stationary. If desired, the controller 127B may include a conventional circuit to supply a signal to brake B to lock the output shaft 130 to prevent the tendency of it to rotate by virtue of its connection with harmonic drive 100 when selector lever S1 is in the neutral position. In addition, controller 127B may also include a conventional dynamic brake circuit so that when selector lever S1 is moved from, for example, an add position across neutral to a subtract position, the control motor 126 is caused to act as a generator thereby stopping its rotation when the selector lever S1 is moved into or through the neutral position. Controller 127B may also include a stop circuit to prevent the appropriate relay to the subtract circuit from closing when the selector lever S1 is moved from, for example, an add position across the neutral position until motor 126 has completely stopped. This prevents opposite polarity voltage from being applied to the motor is still turning in the add direction or vice versa, such circuits being well known in the art.

Accuracy of the add and subtract speeds of the control motor 126 is provided by a conventional closed loop feedback circuit including a tachometer T2 connected to output shaft 130 of motor 126 (see FIG. 7) and which generates a voltage in lead L6 proportional to the speed of output shaft 130. If the speed of the motor shaft 130 decreases because of loading imposed by the driven load, then the output voltage of tachometer T2 in lead L6 will correspondingly decrease. This will cause motor controller 127B to increase the voltage in lead L5 to increase the speed of motor 126 until it reaches the speed selected by selector lever S1. Should the speed of motor shaft 130 increase because of a decrease in loading, the correction will be made in reverse to that stated above.. This assures that the anvil cylinder 18 will rotate at the speed selected as denoted by the diagonal lines in FIG. 9. The selector 127A may be provided with indicia S to indicate the speed selectively added to or subtracted from anvil cylinder 18 which suffices as a readout or visual display of the speed selected.

Thus, it can be seen that with the selector lever S1 in the neutral position, no voltage is supplied in lead L4 to motor controller 127B. Therefore, control motor 126 will remain stationary and the anvil cylinder 18 will rotate at the same speed as die cylinder 16 because it is being driven through the harmonic drive 100 at a 1:1 ratio as previously explained. In this manner, anvil cylinder 18 will track the speed of die cylinder 16 even though the speed of main drive motor 56 is increased or decreased.

However, if the selector lever S1 is moved to some incremental position to add speed to the output of harmonic drive 100 to increase the speed of anvil cylinder 18 with respect to the die cylinder 16, the selector will pick off the selected voltage from tachometer T1 and supply a proportional voltage to motor controller 127B which then causes the control motor 126 to add speed to harmonic drive 100 and thereby increase the speed of anvil cylinder 18. Thus, as the speed of main drive motor is increased, the voltage in tachometer T1 increases so that additional voltage is supplied by the selector 127A to the motor controller 127B which in turn causes control motor 126 to rotate faster thereby increasing the output speed of harmonic drive 100 a proportionate amount and consequently increasing the speed of anvil cylinder 18. In this manner, the anvil cylinder 18 will track the speed of the main drive but at the proportion of its speed as selected by selector S1. The control operates in similar fashion when the selector is moved to a subtract position.

Figure 9:
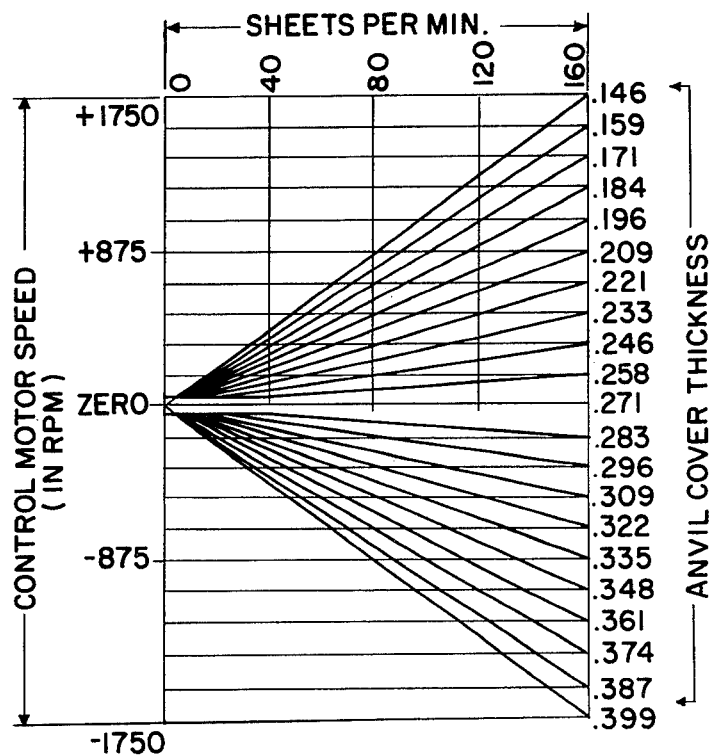
FIG. 9 is a graph illustrating the control motor speed required to match the anvil surface speed to the theoretical production speed of the die-cutter for various anvil cover thickness when using the arrangement of FIGS. 6 and 7.

FIG. 9 graphically illustrates the speed of control motor 126 that is required to match the surface or tangential speed of anvil cylinder 18 to the theoretical production speed of the die cutting machine (that is, the surface or tangential speed of the die cylinder 16) for various anvil cover thicknesses. It can be seen that the speed of main drive motor 56 can be selected somewhere between zero and full which results in a number of sheets per minute as designated in the graph of FIG. 9. The speed of control motor 126 can be selected somewhere between zero and plus 1750 rpm or zero and minus 1750 rpm. For example, if the anvil cylinder cover has worn to the point where it is only 0.146 inches thick (thereby reducing the circumference of cylinder 18 and consequently its tangential velocity), then it will be necessary to add to the speed of the anvil cylinder 18 in order to make the surface speed of the anvil cylinder equal to the surface speed of the blank 40 passing through the die cutting machine. This is done by adding in the full speed of the control motor 126 in the add direction when production speed is also at the full position. As the production speed of the machine is lowered, then it can be seen that the speed of the control motor will fall somewhere along the diagonal line 0.146. It can be also seen that for different anvil cover thicknesses the speed of control motor 126 can be varied to fall along the remaining diagonal lines in proportion to the selected production speed.

The voltage output of tachometer T1 per 1000 rpm of cylinder 15 may be greater than necessary to produce the desired speed relationship between drive motor 56 and control motor 126. The correct relationship is denoted by all of the diagonal lines in FIG. 9. Thus, the divider network of selector 127A may include a conventional trimming potentiometer (not shown) which can be used to adjust the speed of the control motor 126 for a selected drive motor speed to establish the desired speed relationship and maintain the desired accuracy of the system. This arrangement is conventional and well understood by those skilled in the art.

Besides compensating for different anvil cover thicknesses, the speed of the control motor 126 can be varied to add to or subtract from the speed of anvil cylinder 18 to compensate for uneven acceleration or deceleration of the blanks passing between the cylinders resulting from variables such as blank thickness, production speed of the machine, and lengths and shapes of cuts being made in the blanks as previously explained. The speed of the control motor 126 in this instance is selected by visually inspecting or measuring the accuracy of cuts made in the blanks and adjusting the speed of control motor 126 with selector lever S1 until the cuts move to the desired position in the blanks.

When using the drive arrangement of FIG. 6, the same general control of FIG. 8 can be used except that drive motor 80 is used in place of control motor 126 and harmonic drive 100 is omitted with drive motor 80 connected to anvil cylinder 18 as shown in FIG. 6. Motor 80 is an unidirectional motor which actually drives cylinder 18 as well as controls its speed. Its speed range generally parallels that of main drive motor 56 used to drive die cylinder 16. However, its actual speed is controlled by controller 127B to achieve the same overspeed and underspeed relationship provided by control motor 126. Motor controller 127B is slightly different than previously described, as will be well understood by those skilled in the art, to cause motor 80 to track the speed of motor 56 but at the proportion selected by selector lever S1 of selector 127A. In this arrangement, tachometer T1 monitors the speed of cylinder 16 by connection thereto and tachometer T2 monitors the speed of cylinder 18 by connection thereto, both as illustrated in FIG. 6, with tachometer T2 providing a feedback control signal to the controller 127B to provide accuracy of the proportional speed selected as previously explained.

OPERATION

To operate the machine of the present invention, the desired scoring and cutting rule die 35 is selected and mounted on die cylinder 16 in the customary manner. A stack of blanks 40 is placed in the feeder (not shown) and the blanks are advanced individually by advancing means such as by pull rolls 58 and 60 through the die-cutter 10 between cylinders 16 and 18. Preferably, the first few blanks are fed through the machine at a jog speed to be certain that the cutting die is in near registration with the desired location of scores and cuts in the blank. If not, the die may be repositioned around the circumference and/or along the length of the cylinder.

Thereafter, a production speed of the machine is selected and blanks are fed through the machine. At this point, the speed of anvil cylinder 8 has already been set to correspond to the anvil cover thickness being used as represented in FIG. 9.

As the first die-cut blanks emerge, they may be visually inspected for accurate cuts such as by comparing their location with respect to printed indicia which may be present on the blanks. However, a more accurate procedure is to stop the machine (to prevent accumulation of inaccurate blanks) and measure one of the die-cut blanks for accurate location of the creases and cuts such as by using a tape measure 49 as illustrated in FIG. 4. Should measurement reveal that the cuts are too far ahead of where they should be, for example, this would indicate that the velocity of the blank is being impeded in its travel through the machine for one or more of the previously mentioned reasons. Therefore, the selector lever S1 may be moved toward the add position to cause the anvil cylinder 18 to run faster as previously explained. Blanks are again run through the machine at production speed and another blank measured for accuracy of the cuts. This step is repeated until the cuts occur at the exact location desired. As the operator becomes experienced in using the invention, he will soon be able to judge at what location the selector lever S1 should be moved to cause the cuts to move along the blank to the desired location without making many trial and error selections.

Of course, if the cuts should occur behind the desired location, this would indicate that the blank is being accelerated as it passes between the cylinders 16 and 18 and therefore, the selector lever S1 would be moved toward the subtract position in a manner similar to that described above.

In the arrangement of FIG. 2, where only a mechanical transmission 70 is used, the operator would turn the handwheel 78 in the direction necessary to add or subtract from the speed of the anvil cylinder 18.

The input to output ratios of the various transmissions 70, 80, or 100 are preferably selected to cause the anvil cylinder 18 to run at least 2% faster or 2% slower than the speed of die cylinder 16 when the transmission is adjusted, as previously explained, to its full add or subtract condition and, of course, at a fraction of these positions between full and zero. However, it should be understood that the ratio may be selected to provide as much as 10% overspeed and 10% underspeed if desired although the 2% capability is usually sufficient.

Accordingly, by following the very simple operating procedure outlined above, very accurate die cutting is easily attainable.

In the foregoing description, the various transmissions have been illustrated as being connected to the anvil cylinder 18. Instead, they may be connected to the die cylinder 16 so as to control its velocity in proportion to the velocity of the anvil cylinder 18, that is, in reverse to that shown and described. However, connection of the transmission to the anvil cylinder constitutes the preferred arrangement.

Although the invention is more effective with anvil covers 36 securely fastened to the anvil cylinder drum 38, an improvement is made in controlling the velocity of blanks 40 even when conventional free-wheeling anvil covers are used since the covers tend to drag on the cylinder drum and thus the surface velocity of the covers is affected by overspeeding or underspeeding the anvil cylinder.

It should be recognized that the surface velocity of the anvil cover affects the overall velocity of the blank passing between the cylinders thereby controlling the accuracy of cuts made in the blanks. Therefore, it should be understood that the output of the various transmissions described, or the output of equivalent transmissions such as a hydraulic variable-speed transmission, may be connected to an anvil cylinder cover so as to rotate the cover itself around the anvil cylinder which may be stationary. Accordingly, reference to driving the anvil cylinder herein shall be deemed to include such an arrangement.

Having thus described the invention in its best embodiment and mode of operation, that which is desired to be claimed by Letters Patent is:

1. A method of controlling the accuracy of cuts made in a paperboard blank passing between a pair of cooperating die and anvil cylinders comprising the steps of:
driving said die cylinder at a first angular velocity;
driving said anvil cylinder at a second angular velocity; and
selectively changing and maintaining said second angular velocity equal to, faster, or slower than said first angular velocity,
for controlling the velocity of said blank.

2. The method of claim 1 and:
selectively changing said first angular velocity; and
maintaining said second angular velocity selectively proportional to said first angular velocity to correspond to changes in said first angular velocity.

3. The method of claim 1 and:
sensing said first angular velocity; and
driving said anvil cylinder at said second angular velocity in response to said sensing.

4. The method of claim 3 and:
selectively changing said first angular velocity;
sensing changes in said first angular velocity; and
maintaining said second angular velocity selectively proportional to said first angular velocity to correspond to changes in said first angular velocity in response to said sensing.

5. The method of claim 3 and:
selectively changing the proportion of said second angular velocity with respect to said first angular velocity; and
driving said anvil cylinder at a second angular velocity corresponding to the proportion selected.

6. The method of claim 4 wherein the step of driving said anvil cylinder comprises the steps of:
driving a variable-ratio electric motor means at a second angular velocity selectively proportional to said first velocity in response to said sensing; and
driving said anvil cylinder by said motor means at an angular velocity corresponding to said second angular velocity,
for controlling the velocity of said blank.

7. The method of claim 6 and:
sensing changes in said first angular velocity; and
controlling an angular output velocity of said motor means in response to said changes,
for maintaining said corresponding angular velocity selectively proportional to said first angular velocity.

8. The method of claim 6 and:
selectively changing said angular output velocity of said motor means for changing the proportion of said corresponding angular velocity with respect to said first angular velocity.

9. The method of claim 6 and:
directing a first signal corresponding to said first angular velocity to a speed selector means;
directing a second signal from said speed selector means to a motor controller means; and
controlling an output ratio of said motor means by said motor controller means.

10. The method of claim 4 wherein the step of driving said anvil cylinder comprises the steps of:
  driving a mechanical variable-ratio transmission means at a second angular velocity selectively proportional to said first velocity in response to said sensing; and
  driving said anvil cylinder by said transmission means at an angular velocity corresponding to said second angular velocity;
  for controlling the velocity of said blank.

11. The method of claim 10 and:
  sensing changes in said first angular velocity; and
  controlling an angular output velocity of said transmission means in response to said changes,
  for maintaining said corresponding angular velocity selectively proportional to said first angular velocity.

12. The method of claim 10 and:
  selectively changing said angular output velocity of said transmission means for changing the proportion of said corresponding angular velocity with respect to said first angular velocity.

13. The method of claim 10 and:
  directing a first signal corresponding to said first angular velocity to a speed control means;
  directing a second signal from said speed control means to a ratio control motor means; and
  controlling an output ratio of said transmission means by said ratio control motor means.

14. A method of controlling the accuracy of cuts made in a paperboard blank passing between a pair of cooperating die and anvil cylinder means comprising the steps of:
  driving said cylinder means at a selected angular velocity;
  passing a paperboard blank between said cylinder means for making cuts therein;
  observing the accuracy of said cuts made in said blank; and, thereafter,
  selectively changing and maintaining the angular velocity of one of said cylinder means equal to, faster, or slower than the angular velocity of the other of said cylinder means in response to observing inaccurate cuts in said blank to control the accuracy of cuts made in succeeding blanks passing between said cylinder means.

15. The method of claim 14 and:
  displaying the difference between the angular velocities of said cylinder means following adjustment of the angular velocity of said other cylinder means.

16. A method of controlling the accuracy of cuts made in a paperboard blank passing between a pair of cooperating die and anvil cylinder means comprising the steps of:
  driving said anvil cylinder means at a first angular velocity;
  driving said die cylinder means at a second angular velocity; and
  selectively changing and maintaining said second angular velocity equal to, faster, or slower than said first angular velocity;
  for controlling the velocity of said blank.

* * * * *

REEXAMINATION CERTIFICATE (1315th)
United States Patent
Garrett et al.

[11] B1 3,899,945
[45] Certificate Issued  Jul. 3, 1990

[54] METHOD AND APPARATUS FOR ACCURATE DIE-CUTTING

[75] Inventors: Clyde B. Garrett, Lanham; William S. Thayer, Lutherville, both of Md.

[73] Assignee: United Container Machinery Group, Inc., Glen Arm, Md.

Reexamination Request:
No. 90/001,667, Dec. 14, 1988

Reexamination Certificate for:
Patent No.: 3,899,945
Issued: Aug. 19, 1975
Appl. No.: 411,941
Filed: Nov. 1, 1973

Related U.S. Application Data
[62] Division of Ser. No. 319,163, Dec. 29, 1972.

[51] Int. Cl.⁵ .......................... B23D 25/12; B26D 1/56
[52] U.S. Cl. ............................................. 83/38; 83/72; 83/299; 83/313; 83/346; 83/561
[58] Field of Search .................... 83/38, 72, 299, 312, 83/313, 311, 346, 347, 561, 298; 241/63, 64

[56] References Cited
U.S. PATENT DOCUMENTS

| | | | |
|---|---|---|---|
| 1,721,408 | 7/1929 | Perdreau | 74/393 |
| 1,802,968 | 4/1931 | Everett et al. | 83/299 |
| 1,867,529 | 7/1932 | Jones | 101/248 |
| 1,958,137 | 5/1934 | Fowler | 83/346 X |
| 2,565,565 | 8/1951 | Landau | 74/640 |
| 2,694,941 | 11/1954 | Spiller | 74/393 |
| 2,706,944 | 4/1955 | Claff et al. | 83/312 |
| 3,008,366 | 11/1961 | Taylor | 83/346 |
| 3,276,306 | 10/1966 | Winkler et al. | 83/346 X |
| 3,347,119 | 10/1967 | Sarka | 83/38 |
| 3,448,646 | 6/1969 | Bishop | 83/38 X |
| 3,487,722 | 1/1970 | Cline | 74/675 |

FOREIGN PATENT DOCUMENTS
397696  7/1941  Canada .

Primary Examiner—Hien H. Phan

[57] ABSTRACT

Inaccurate cuts often occur in paperboard blanks passing between a pair of cooperating die and anvil cylinders because of anvil cylinder wear, irregular blank velocity, and other factors. Such inaccuracies are reduced by the method of driving the die cylinder at a preselected angular velocity and driving the anvil cylinder at an angular velocity proportional to the angular velocity of the die cylinder with the preselected proportion being maintained during changes in angular velocity of the die cylinder. The apparatus generally preferred for performing the method includes a mechanical variable speed transmission having an input driven by the die cylinder and an output for driving the anvil cylinder at an angular velocity corresponding to the angular velocity of the input and with the output velocity being selectively variable with respect to the input to provide an output velocity selectively proportional to the input velocity. However, the apparatus primarily preferred for performing the method includes a sensor means for sensing the velocity of the die cylinder, a variable speed motor means for driving the anvil cylinder, and a motor controller means responsive to the sensor means for controlling the output speed of the motor means to proportionally correspond to the velocity of the die cylinder, the controller means also including variable speed control means for changing the proportion of the anvil cylinder velocity to the die cylinder velocity for changing the output speed of the motor means. Another embodiment utilizes a mechanical variable speed transmission means in lieu of the motor means and a ratio control motor means responsive to the sensor through a similar motor controller means for varying the output of the transmission means to achieve a preselected proportion which is maintained during changes in velocity of the die cylinder.

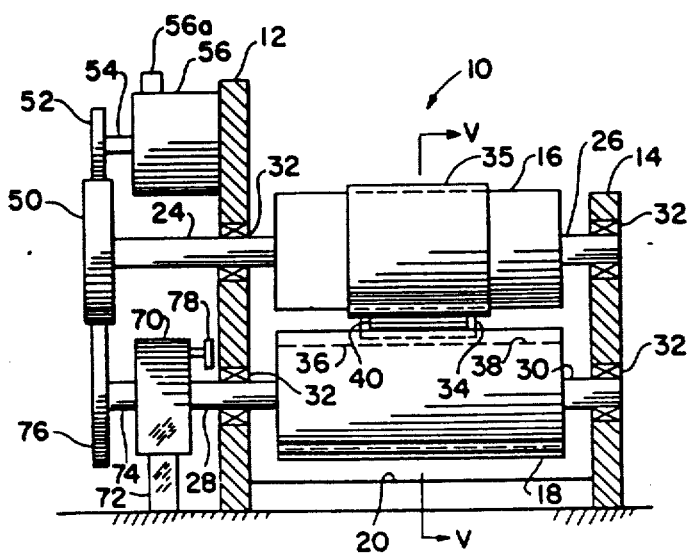

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 through 15 is confirmed.

Claim 16 is cancelled.

* * * * *